Nov. 21, 1944.  C. H. HOLDER  2,363,247
DEGASSING OF LIQUIDS
Filed Nov. 20, 1942
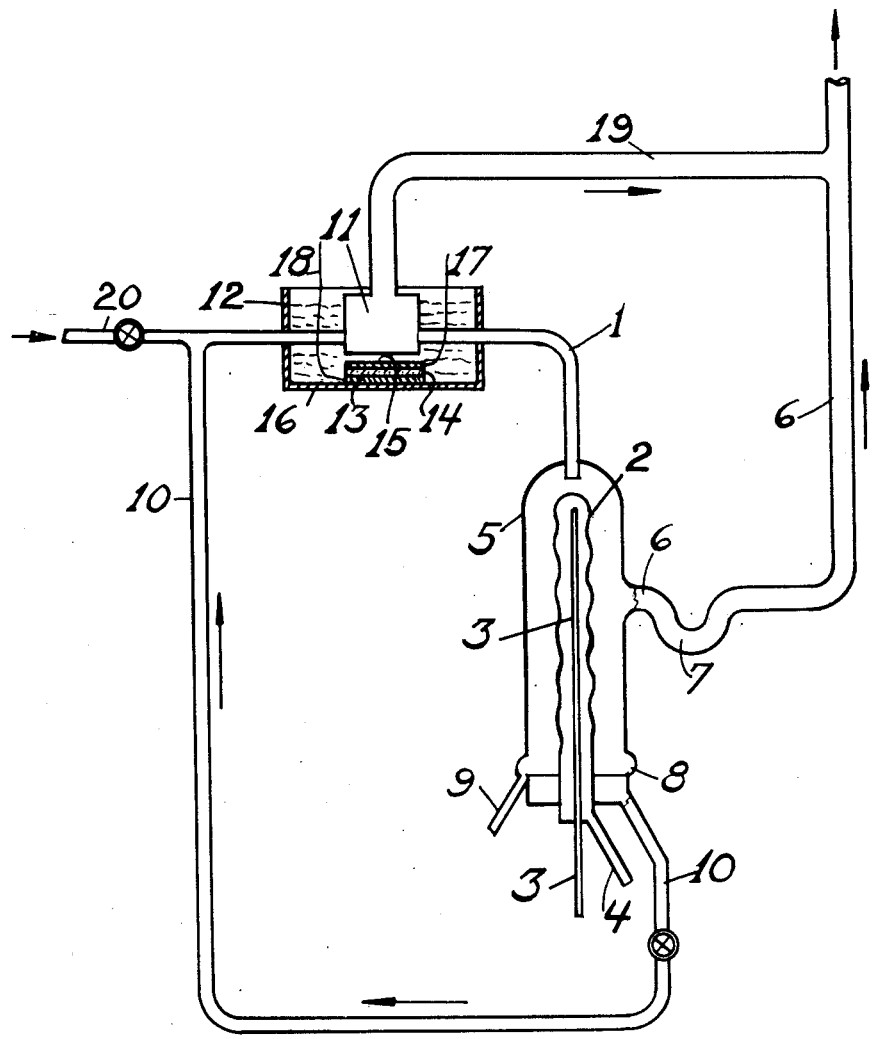
Clinton H. Holder Inventor
By C. L. Young Attorney Patented Nov. 21, 1944

2,363,247

UNITED STATES PATENT OFFICE 2,363,247

DEGASSING OF LIQUIDS

Clinton H. Holder, Cranford, N. J., assignor to Standard Oil Development Company, a corporation of Delaware Application November 20, 1942, Serial No. 466,327

7 Claims. (Cl. 202—52)

This invention relates to the removal of absorbed gases from liquids such as mineral and vegetable oils, and more particularly relates to such a process when employed as a preliminary treatment in the short path or molecular distillation, or high vacuum distillation of such liquids.

Molecular distillation processes are well known and have been found extremely useful in the distillation of various waxes, lubricating oils, oils for high vacuum work, synthetic polymers, natural oils such as fish, cottonseed, corn and soy bean oils. The principle employed in the distillation lies in the use of a vacuum such that the mean free path of the molecules escaping from the thin film of a liquid on a heated surface is greater than the distance between the condensing surface and the heated surface. In commercial practice these surfaces frequently are cylindrical in shape and the material to be distilled is circulated repeatedly in a thin liquid film over the inner heating surface and condensed on the cooled outer surface. In the past, in an operation of this type the overall efficiency has been materially impaired because of the necessity of degassing the liquid for several hours prior to distillation in order to reach the desired vacuum and to obtain a material free of any tenaciously absorbed gases which would otherwise be released during the distillation. This has been found necessary because in short path and molecular distillation operations as previously practiced, the organic oils containing absorbed gases when used in the distillation process have been found to give trouble because of the fact that the gases contained therein drastically reduced the vacuum to such a point that the distillation did not proceed as required for effectively separating the constituents of the organic oil. Further difficulty may result when degassing is not complete if, in the case of oxidizable compounds such as vitamins, oxygen absorbed from the air remains in the oil in material amounts as it will cause decomposition of the sensitive material when heated in the still. In order to overcome these difficulties, oils which are to be subjected to such distillation processes must therefore be effectively degassed. In the past this has been accomplished by subjecting the oil to vacuums of the same order or higher than those encountered in the short path molecular distillation equipment prior to the introduction of the oils into such equipment, but this is not particularly effective from a commercial standpoint because of the fact that long periods of time are required for this vacuum treatment to remove the gas from the oil so as to attain an approximate equilibrium under the particular pressure maintained above the oil surface. This may be hastened to some extent by circulating the liquid for several hours over the heating surface prior to distillation but for some materials which are unstable such exposure to elevated temperatures may result in decomposition of the material. In fact, those skilled in the art agree that degassing is a necessary yet time consuming and tedious procedure as ordinarily carried out. Several improved methods have been suggested in the past for degassing organic liquids which are then to be subjected to short path or molecular distillation. Usually these methods heretofore known have involved the use of considerable auxiliary equipment and have involved a great deal of trouble to accomplish such degassing operations.

It is an object of the present invention to provide an improved method for removing absorbed gases from organic oils which are to be subjected to high vacuum distillation processes such as short path or molecular distillation. Other objects will be apparent with a fuller understanding of the invention as hereinafter described.

It has been found that a considerable saving in time and a decrease in the length of exposure of organic liquids to elevated temperature conditions which might tend to decompose the same can be effected by the use of either sonic or ultrasonic vibrations as applied to these organic liquids prior to their entrance into a short path or molecular distillation operation. These vibrations may range between about 1,000 and about 2,000,000 cycles per second. It has also been found that this may be carried out with the greatest intensity where the sound energy is greatest, and furthermore, since the degassing effect has been found to be marked, even when the organic liquid is subjected to these vibrations or pressure waves through the medium of a glass container such as a flask, it is readily understood that these vibrations may be directly introduced into the organic liquid without the necessity of removing it from the glass equipment such as is encountered in molecular distillation. The desired vibrations of the desired number of cycles per second may therefore be employed either as a portable unit or may be built into a molecular distillation equipment wherein the thin film flowing across a heated surface is removed from the wall and recycled, the treatment with the high frequency pressure waves being made at some point in the system between the withdrawal of the liquid film from the wall and its reintroduction thereinto.

A source of such vibrations is, for example, a quartz crystal having electrodes and mounted between the two electrodes, which are in turn connected to a source of high frequency alternating current. Another method of inducing these high frequency vibrations especially in the low frequency range (1000 to 100,000 cycles per second) is by means of the magnetostrictions of a metal rod when placed in the field of a high frequency alternating current. If desired, these high frequency pressure waves and vibrations may be applied to the organic liquid to be subjected to high vacuum distillation directly, that is, by having the quartz crystal placed in juxtaposition to a plate or false bottom of a container into the top of which the organic liquid to be degassed is introduced, or a carrier oil of high di-electric strength may be employed by submersion of the quartz crystal into said oil, the said oil also being relatively immiscible with the organic liquid being degassed, and the vibrations in such an instance being directly transmitted through the carrier oil to its interface with the organic liquid to be distilled.

An illustrative embodiment of my invention is shown in Figure 1. It consists of a heated column closely adjacent to an enclosed cool surface. The head of the vertical heated column is under a source of liquid supply. In the apparatus illustrated a pipe 1 introduces the oil or other liquid to be treated to the still. The oil is allowed to drop from tube 1 to the glass dome 2 as shown. This flow may be regulated by means of a gas-tight valve. The column 2 is shown having a spiral wound about the outside to spread the oil evenly over the surface in a thin layer. However, any other means to accomplish this may be used as desired. Inside the dome on column 2 is a tube 3 which supplies steam or hot vapor to the inside of the column to warm the dome to the desired temperature. Any other means for heating the dome may be substituted for that shown as desired. With the heating means shown the vapor condenses within the dome 2 and is returned to the broiler through pipe 4. The dome is surrounded by a cylindrical chamber 5, the walls of which are an inch or less from column 2. If desired the walls of this chamber may be artificially cooled. The chamber 5 is completely enclosed so that it may be evacuated. To it is attached a pipe 6 having a trap 7 and leading to an evacuation pump. Trap 7 is preferably artificially cooled to condense any vapors passing through. Liquid condensed on the wall of chamber 5 is collected in a trough 8 and removed through pipe 9. Undistilled oil collects at the bottom of chamber 5 after running down the side of column 2 and is removed through line 10 which passes into degassing space 11 located in vessel 12, filled with light mineral oil or other liquid. This vessel also contains a quartz crystal 13 having electrodes 14 and 15 on opposite sides thereof and supported on bottom 16 of vessel 12. These electrodes are attached by wires 17 and 18 to a suitable source of high frequency alternating current such as an oscillator circuit capable of turning to any desired frequency between 1,000 and 2,000,000 cycles per second. Gas disengaged in space 11 is removed through line 19 connected to withdrawal pipe 6. Fresh material may be introduced into recycle line 10 through line 20.

The particular frequencies employed and the amplitude of these frequencies may be so adjusted as to give efficient degassing, thus it is found that while the degassing is greatest using high sound energy, at high amplitudes of vibration nevertheless, considerable heat is developed which would tend to decompose the organic liquid to be distilled since usually these organic liquids are quite unstable thermally, so that it is even necessary to employ cooling coils in the body of liquid being degassed, or to lower the sound energy and its amplitude to avoid the generation of large quantities of heat. Thus, for example, 8,000 cycles per second using a current of about 240 watts are sufficient for the degassing of lubricating oil or transformer oil in about 15 minutes. The same is true in the degassing of vitamin D concentrate or fish oils where a frequency of about 250,000 cycles per second, at a wattage of about 350, for about 40 minutes, is usually sufficient in the ordinary molecular distillation of these types of organic liquids for effectively, substantially completely degassing the same prior to their introduction into the molecular distillation equipment.

Having thus described the nature and conception of the invention, what is desired to be secured by Letters Patent is:

1. A process for the distillation of organic liquids which comprises passing said liquids in a thin layer over a heated surface subjected to high vacuum conditions so as to vaporize a portion of said liquid, condensing said vapors on a cooled surface spaced from said heated surface at a distance less than the mean free path of the vapor molecules, continuously withdrawing said condensed vapor from said cooled surface, continuously withdrawing said unvaporized liquid from said heated surface, subjecting said withdrawn unvaporized liquid to the action of high frequency pressure waves for a sufficient length of time to effect a substantial complete separation of absorbed gas from said liquid and continuously recycling degassed liquid to said heated surface.

2. The process as in claim 1, in which the high frequency pressure waves are between about 1,000 and about 2,000,000 cycles per second.

3. The process as in claim 1, in which the high frequency pressure waves are between about 5,000 and about 500,000 cycles per second.

4. Process as in claim 1, in which the high frequency pressure waves are ultrasonic in character.

5. The process as in claim 1, wherein the organic liquids comprise a fish oil.

6. The process as in claim 1, wherein the organic liquid comprises a mineral oil.

7. Process as in claim 1, wherein the organic liquid comprises a vegetable oil.

CLINTON H. HOLDER.